United States Patent

Dalhart

[11] Patent Number: 5,957,152
[45] Date of Patent: Sep. 28, 1999

[54] SELECT VALVE PURGE

[75] Inventor: Mark D. Dalhart, Mason, Ohio

[73] Assignee: Hydro Systems Company, Cincinnati, Ohio

[21] Appl. No.: 08/710,976

[22] Filed: Sep. 24, 1996

[51] Int. Cl.[6] .............................. B05B 7/30; F16K 11/02
[52] U.S. Cl. .............. 137/239; 137/625.11; 137/625.41; 137/893; 222/571
[58] Field of Search .................. 137/238, 239, 137/625.11, 625.41, 893, 150, 895; 251/4, 5, 342; 222/571

[56] References Cited

U.S. PATENT DOCUMENTS

| 205,163 | 6/1878 | Winkler | 137/150 |
|---|---|---|---|
| 241,551 | 5/1881 | Lathe et al. | 137/150 |
| 317,465 | 5/1885 | Lyman | 137/150 |
| 383,153 | 5/1888 | Siersdorfer | 137/150 |
| 2,721,008 | 10/1955 | Morgan, Jr. | 222/571 |
| 2,988,103 | 6/1961 | Canvasser | 251/5 |
| 3,013,575 | 12/1961 | Persson | 137/150 |
| 3,298,391 | 1/1967 | Savage | 251/5 |
| 3,586,049 | 6/1971 | Adamson | 137/625.41 |
| 3,687,163 | 8/1972 | Nickels | 137/625.41 |
| 3,762,439 | 10/1973 | Heath | 137/549 |
| 4,004,717 | 1/1977 | Wanke | 222/571 |
| 4,191,213 | 3/1980 | Dölling | 137/625.11 |
| 4,458,708 | 7/1984 | Leonard et al. | 137/625.11 |
| 4,604,093 | 8/1986 | Brown et al. | 137/625.11 |
| 4,790,344 | 12/1988 | Chauvier et al. | 251/5 |
| 5,048,559 | 9/1991 | Mathieu et al. | 251/5 |
| 5,049,042 | 9/1991 | Mathieu et al. | 251/5 |
| 5,065,910 | 11/1991 | Fiedler | 222/571 |
| 5,105,851 | 4/1992 | Fogelman | 137/625.11 |

Primary Examiner—George L. Walton
Attorney, Agent, or Firm—Wood, Herron & Evans, L.L.P.

[57] ABSTRACT

A purge valve for use with a chemical select valve comprises, in a preferred embodiment, an enlarged chamber in the vacuum impelled feed line to the select valve. The chamber is formed by resilient walls, collapsible upon vacuum operation to draw chemical into a venturi line where it is mixed with water and dispensed. The walls do not fully collapse and provide passages for chemical flow. Upon vacuum interruption, the chamber walls expand, returning the chamber to its larger volume and drawing chemical back upstream from common passages in the select valve. Another chemical can then be selected without contamination of the preceding chemical in the common passages.

16 Claims, 2 Drawing Sheets

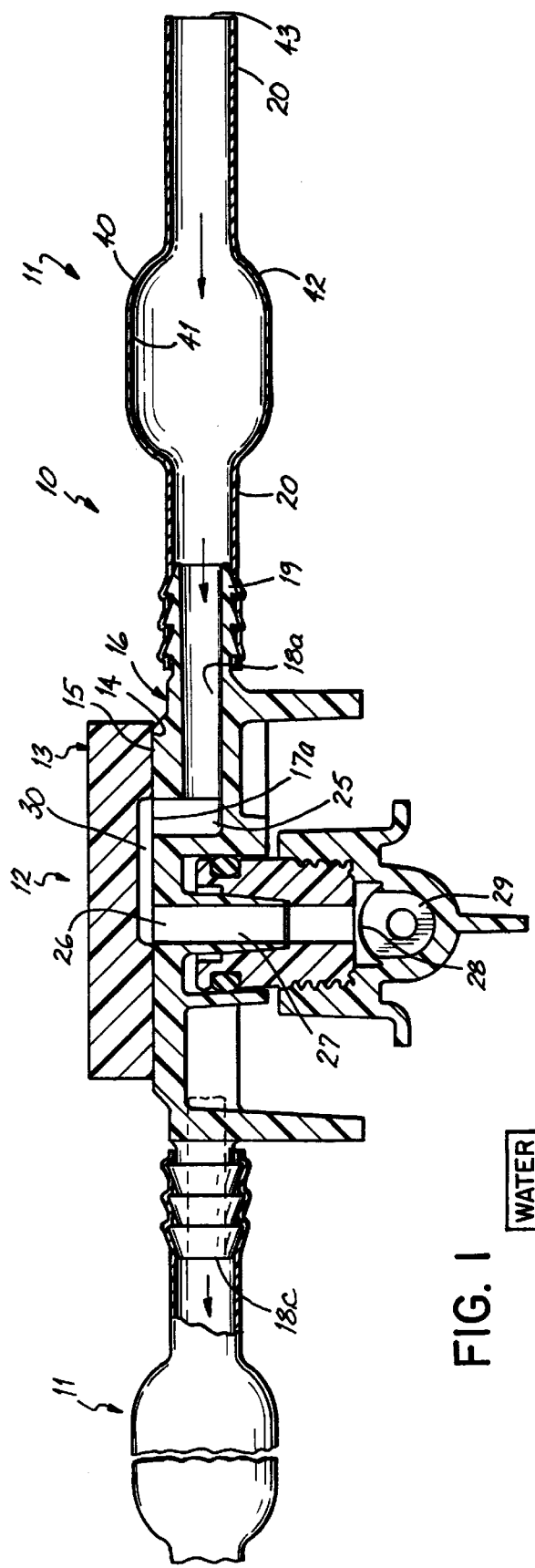
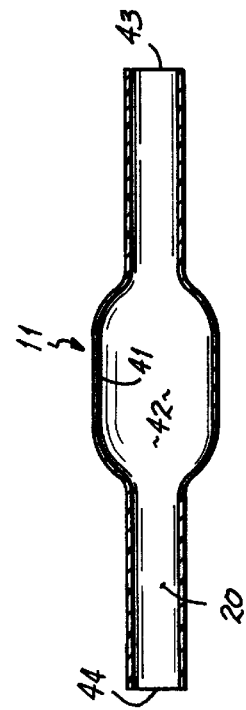

SELECT VALVE PURGE

FIELD OF THE INVENTION

This invention relates to chemical dispensing valves and more particularly to apparatus for purging previously dispensed substances from common passages in a select valve, so newly selected substances will not be compromised or contaminated.

BACKGROUND OF THE INVENTION

In the dispensing of substances such as, for example, cleaning or other compounds, it is common to use a water driven venturi to create a vacuum to suck up a selected chemical substance into the water stream where it is diluted for downstream dispensing. Where it is desired to dispense more than one mixture, a select valve is used to select which of several chemicals will be sucked into the water stream.

One such select valve is described in U.S. Pat. No. 5,377,817 which is expressly incorporated herein by reference as if fully reproduced herein.

Reference is also made to applicant's corresponding application Ser. No. 08/673,332 filed Jun. 28, 1996 which in part discloses an improvement to U.S. Pat. No. 5,377,718 and which is also expressly incorporated herein by reference.

In these two disclosures, a rotatable sealing disc has a sealing face urged against the opposed sealing face of a multiple port plate. The sealing disc has at least one blind slot extending radially outwardly from a center outlet or venturi port. The sealing disc can be rotated to move the blind slot about the center port so the other end of the slot overlies a selected inlet port connected to at least one source of a chemical to be sucked into the venturi for dilution and dispensing. Rotation of the sealing disc thus selects an inlet port to be connected to the common center outlet or venturi part so a selected chemical can be dispensed.

Once a selected chemical is dispensed, the chemical flows from the chemical conduit or pick up line through the inlet port into the blind slot and through the outlet port through a passage to the venturi. When another chemical is selected, it is typical to stop the water flow and then turn the sealing disc to align the blind slot with the new inlet port. It will be appreciated, however, that portions of the first selected chemical remain in the blind slot, center port and passage to the venturi. Thus, when the second chemical is dispensed, the first effluent is compromised or contaminated by remnants of the first selected chemical. This initial contamination may not last long, but where mix ratios are critical, or purity of the dispensed effluent is desired, this contamination constitutes a problem.

One method of cleaning the common passages of a select valve, prior to dispensing a newly selected chemical, is to purge the passages by selecting an inlet port connected to a purge compound. This requires selection of a purge position, and venturi operation for the duration of the purge. This thus requires operation of the final dispenser into a purge recirculation or waste tank and obviously requires extra time and the expense of apparatus associated with the purge operation.

It has thus been one objective of the invention to provide apparatus for purging common passages in a select valve prior to selection of a second compound to be dispensed.

A further objective has been to provide apparatus for removing a first selected chemical from the common passages of a select valve prior to selection of a second chemical.

A further objective has been to provide apparatus for purging passages of a valve without flushing with a purge material.

A further objective has been to provide improved methods for purging a select valve.

SUMMARY OF THE INVENTION

To these ends, a preferred embodiment of the invention includes a resilient, vacuum operated suction chamber disposed in each vacuum impelled chemical supply conduit or pick up line just upstream of each chemical inlet port to the select valve. When the venturi is operated, it sucks first selected chemical to and through a selected inlet port. This creates a vacuum in the chemical pick up line to the valve. The resilient chamber is provided in, and as part of, the pick up line. Since there are preferably no restricting devices between the select valve inlet port and the chamber, the chamber is exposed to unrestricted vacuum during this dispensing cycle and partially collapses upon application of the suction from the venturi. Such collapse is not complete and passages still exist through the chamber for flow of the selected chemical. The chamber volume, however, is decreased. Upon termination of venturi flow, vacuum is interrupted and the select valve effectively vented. The chamber walls thus expand back to their original condition. This increases the chamber volume and creates a vacuum or suction in the conduit to the select valve and venturi, drawing back a volume of chemical material from the select valve.

The volume differential between the collapsed chamber and its expanded or free state represents the volume of chemical which can be pulled back from the select valve. Since this differential is greater than the passive volume of the select valve and its outlet passage (i.e. the common passages), those areas are purged of residual or remnant chemical. Thus the vacuum created by the chamber pulls the remnant chemical in the common passages of the valve, including the blind slot, center port and passage to the venturi, back upstream into the chemical conduit, clearing these common areas for selection of another chemical. No purge flow or purge material is necessary, and with use of such a purge valve for each chemical inlet, the purge action is automatic and instantaneous.

These and other objectives and advantages will be readily apparent from the following detailed description of a preferred embodiment of the invention and from the drawings in which:

BRIEF DESCRIPTION OF THE DRAWINGS

FIG. 1 is a view partly in cross section of the invention in use with a typical select valve;

FIG. 2 is a cut-away view of the internal components of a select valve of FIG. 1;

FIG. 3 is a side view of the invention without vacuum applied;

DETAILED DESCRIPTION

Figure 4:
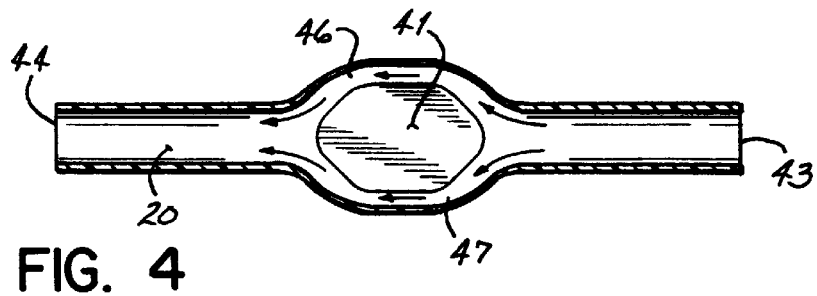
FIG. 4 is a side view of the invention with vacuum applied and showing still open passages.

Turning now to the drawings, there is shown in FIG. 1 a select valve and purging apparatus 10 according to the preferred embodiment of the invention. A purge valve 11 is utilized in conjunction with a select valve 12. The select valve 12 can be any select valve such as that described and shown in U.S. Pat. No. 5,377,718, which is expressly incorporated herein by reference.

It will be appreciated that the purge valve 11, according to the preferred embodiment of the invention, can be utilized with any suitable form of select valve or other valve in which it is desired to draw back or purge materials just downstream of the purge valve 11.

For purposes of the description of the preferred embodiment of the invention, however, the select valve 12, as will be seen, includes a rotatable sealing disc 13 having a sealing face 14 mounted over the sealing face 15 of a port plate 16. The port plate 16 has a plurality of ports 17a, 17b, 17c, 17d, further described as an inlet port. The port plate 16 defines in part a passageway 18 having a connection barb 19 for a feedline or conduit 20 of purge valve 11. The port plate 16 also includes an inlet passage 25, a center port 26 and an outlet passage 27 connected to a vacuum inducing venturi section 28.

Sealing disc 13 defines a radially oriented blind slot 30. It will be appreciated that, as the sealing disc 13 is rotated, the blind slot is rotated and, while always connected to the center port 26 and outlet passage 27, selectively connects one of the various ports 17a, 17b, 17c or 17d to the center port 26 and outlet passage 27 and therefore to the venturi section 28. In this manner, a plurality of inlet passages, such as 18a, 18b, 18c or 18d can be selectively connected to the center port 26, passage 27 and venturi section 28 as desired.

Venturi section 28 includes a venturi passage 29 through which a fluid such as water can pass and, because of the construction of venturi section 28, induces a vacuum in the passage 27 at port 26 and through the slot 30 to the port 17 and the inlet passages as selected, such as 18a, as shown in FIG. 1. A valve "V" of any suitable type is operable to start and stop water flow through the venturi and thus to create or interrupt the feed vacuum generated by water flow through the venturi in a well-known manner.

When a chemical is present in the feed line 20 and liquid or water flows through the venturi passage 29, the vacuum induced pulls the chemical in the feed line 20 through the inlet passage 18a, through the port 17a, through the blind slot 30 and through center port 26 and a passage 27 in the venturi section 28. There, the chemical is intermixed and diluted in the water and can be dispensed as desired.

When the sealing disc 13, however, is turned to select another inlet port, such as inlet port 17b, for example, it will be appreciated that chemical remains in certain common areas of the select valve 12. These common areas would, in the configuration of the valve 12 as shown, include the blind slot 30, the center port 26 and the passageway 27 down to the venturi section 28 and venturi passage 29.

Thereafter, if another chemical from another inlet port such as 17b is selected, the initial vacuum created through the venturi passage 29 will begin to pull any remnant material left in the slot 30 and passage 27, for example from inlet 18a, into the water. The initial dispensation of the second chemical will thus be contaminated or compromised by the remnant materials in the common areas 30 and 27 of the select valve 12.

The purge valve 11 is utilized to purge the select valve before the changeover is made from the selection of one chemical to another. In particular, it will be appreciated that the purge valve 11, in the preferred embodiment, comprises a resilient bulb with two tube-like ends defining pickup lines 20. The purge valve thus includes a generally cylindrically expanded section 40 defining chamber 42 as part of the feedline 20. The expanded section 40 comprises generally cylindrical walls 41 which are preferably resilient and relatively collapsible upon the application of the feed vacuum from the vacuum section 29.

As shown in FIG. 1, however, the purge valve 11 is in its expanded or static condition, so as to provide a substantially opened chamber 42 for receiving a chemical from the upstream end 43 of the purge valve 11. Chamber 42 comprises a part of the chemical infeed or pickup line 20.

Figure 5:
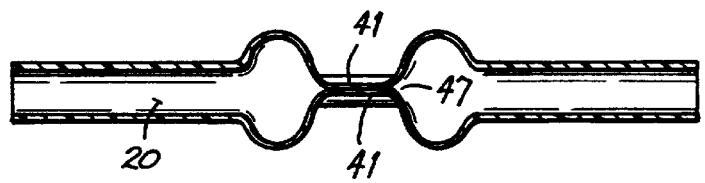
FIG. 5 is a top view of the invention as in FIG. 4.

Turning now to FIGS. 3 through 5, it will be appreciated that FIG. 3 illustrates the purge valve 11 without a vacuum applied thereto. It will be seen that the purge valve 11 includes an elongated member comprising a feed or inlet line 20, having a distal end or an upstream end 43 and a downstream end 44, which is connected to the barb 19 (FIG. 1).

As shown in FIG. 4, however, a vacuum has been applied to the purge valve 11 when it is connected with a select valve as shown in FIG. 1. In this condition, it will be appreciated that the walls 41 of the purge valve 11 have been pulled inwardly by the application of the feed vacuum so that the walls touch in the general area illustrated in FIG. 4.

It will be appreciated that the purge valve 11, however, only partially collapses, leaving passages 46 and 47 around the collapsed touching walls 41 for the chemical selected to flow therethrough in the feedline 20 and from the upstream end 43 to the downstream end 44 of the purge valve. Another view of this same condition is shown in FIG. 5, where the walls 41 have collapsed inwardly to seal off the center area of the chamber and to define separate passages 46 and 47.

Accordingly, it will be appreciated that the purge valve 11 comprises a collapsible and expansible chamber 42 having resilient walls 41 being provided on each end with a portion of an infeed or pick up line 20. The chamber is collapsible upon the application of a vacuum and expansible when the vacuum is terminated.

In use, it will be appreciated that a purge valve 11 is provided for each inlet passage 18 and each chemical or infeed pick up line.

Returning to FIG. 1, when the venturi is charged with a water flow, the vacuum pulls the chemical in the pick up line 20 through the valve for dispensing, in diluted form, with the venturi water. In this condition and referring to FIGS. 4 and 5, that chemical flows through the passages 46 and 47, through the pick up line 20 and into the select valve. At this point in time, the chamber 42 is collapsed by the vacuum, thereby reducing the overall volume of the chamber.

When it is desired to either stop dispensing chemical or to change over to a different chemical, the water flow is terminated or interrupted by means of a push button or other valve "V" associated with the select valve or just upstream of the venturi.

The termination of the water flow in the venturi passage 29 interrupts the vacuum generated by the venturi in the passage 27 and the slot 30. Upon termination of the vacuum, the expansible chamber 42 formed by the walls 41 in the purge valve 11 expands to a greater volume. This draws back upstream any chemical or material in the common passages of the select valve 12, such as passage 27 and blind slot 30.

The chamber 42 formed by the walls 41 in the purge valve 11 has a predetermined expanded or static volume. When the chamber is partially collapsed by the application of the feed vacuum, the volume of the chamber is reduced. The differential volume between the expanded volume and the collapsed or reduced volume of the chamber is that volume which is available and operable to draw back material or chemical from the select valve. The purge valve chamber 42 is selected such that the differential volume is preferably greater than the volume of the common passages or areas in the select valve or other valve with which the purge valve 11 is to be used.

In that way, when the chamber expands upon termination of the feed vacuum, it draws back a volume of material which is at least equal to, and preferably greater than, that volume which is represented by the passage 27 and slot 30, for example, in the select valve. Accordingly, it will be appreciated that the volume differential between the expanded and collapsed chambers of the purge valve is preferably greater than the volume of the common passageways in the select valve.

Accordingly, all the remnant material in the common passages of the select valve is purged or drawn back, at least past the port 17a and preferably further, such that, when the sealing disc 13 is thereafter turned to select another chemical, the blind slot 30 and passageway 27 are cleared of any remnant or residual chemical from the first dispense cycle and a fresh dispense cycle can be started with a new chemical without compromise or contamination.

Figure 6:
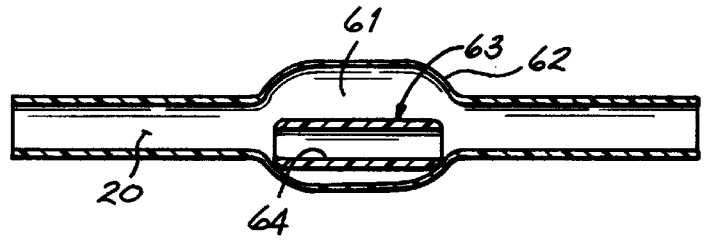
FIG. 6 is a side view of an alternative embodiment of the invention without vacuum applied.
Figure 7:
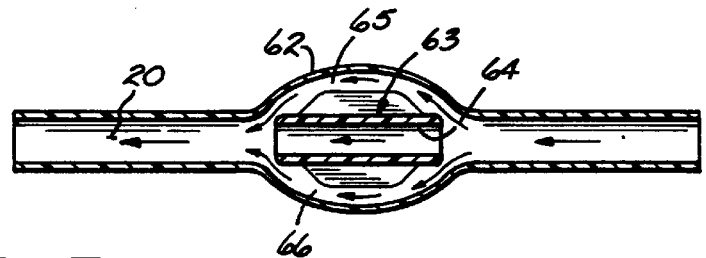
FIG. 7 is a side view of the invention with vacuum applied and showing still open passages.
Figure 8:
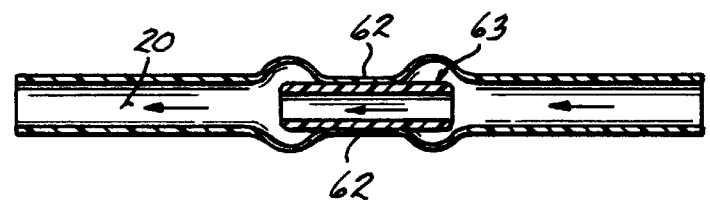
FIG. 8 is a top view of the alternate embodiment of the invention as in FIG. 7.

Turning now to an alternative embodiment as illustrated in FIGS. 6 through 8 of the invention, it will be appreciated that a purge valve 60 comprises an enlarged chamber 61 defined by resilient walls 62 and chemical inlet or pick up lines 20. This purge valve can be the same as the purge valve 11 previously described, with the exception that within the purge valve is a tube 63 having an interior passage 64.

Referring to FIG. 6, the tube simply resides within the chamber 61 of the purge valve 60 formed by the collapsible or resilient wall 62.

Turning to FIG. 7, it will be appreciated that the purge valve 60 is shown with the feed vacuum applied. In this condition, the walls 62 have collapsed against the side of the tube, as particularly shown in FIG. 8; however, chemical or material can still flow in the pick up line 20 through the interior passage 64 of the tube.

Also, it will be appreciated that small passages 65 and 66 are provided at the edges of the wall above and below the tube, to accommodate additional flow. In any event, the chamber 61 formed by the walls 62 is collapsed when the vacuum is applied, as shown in the figures, but such collapsing is limited by the tube 63 which preferably is more rigid than the walls 62.

Accordingly, the tube 63 ensures sufficient cross-sectional flow area for the chemical or material to be sucked through the pick up line 20 and into any select valve with which the purge valve 60 may be used. The tube prevents the full closing of the walls 62 or chamber 61, which would leave no sufficient passageway for chemical.

Upon termination or interruption of the feed vacuum, the walls 62 expand outwardly so that the chamber 61 resumes its static configuration. It will be appreciated that the chamber 61 in the static condition has an expanded volume, and has a reduced volume when the chamber is collapsed by the application of a vacuum. Accordingly, when the vacuum is terminated, such as in the procedure described above with respect to purge valve 11, the chamber returns to its expanded or greater volume. This creates a reverse vacuum on any chemical downstream of the chamber and draws that chemical back in an upstream direction. Again, the differential in the expanded and collapsed volume of the chamber is preferably greater than any common passages in a select valve with which the purge valve 60 may be used, so that the common areas of the select valve are purged of any residual or remaining chemical which might contaminate the initial dispensing of another selected chemical.

It will be appreciated that, in some applications, such a select valve is used with chemicals mixed with water at very low concentrations, such as 512 parts water to 1 part chemical. In those cases, even a small amount of chemical carryover or contamination could cause dilution ratios to be out of specification, especially when dispensing the diluted mixtures into small containers, such as 25 ounce spray bottles.

Accordingly, it will be appreciated that the purge valves, such as 11 and 60 described herein, are particularly useful to purge the select valves used in such systems, particularly where specific dilution ratios and the reduction of cross-contamination are important.

It will be further appreciated that the use of the purge valves described herein are not particularly limited for use with the particular select valve shown. Instead, the purge valves can be used whenever it is desirable to retract an advanced portion of a vacuum impelled fluid line.

It should be further appreciated that the expansible chamber as described herein, which is formed from the resilient walls of a feed line and, more particularly, comprises a cylindrically expanded section defined by resilient walls in a feedline, could be modified to take on any suitable form. While elastomeric enlarged portions of the feedline could be utilized as described, a piston spring and cylinder or a bellows material, both of which would collapse under vacuum, or any other sort of suitable expansible chamber device might be utilized, including any such device that is reduced in volume under vacuum and returns to original volume after vacuum is interrupted.

Accordingly, a chamber could be utilized which, in and of itself, does not form part of the pickup line, as does the chamber in the purge valves 11 and 60 described above. For example, an expansible vacuum responsive bulb might be connected into a branch line in a pickup line near the inlet to a select valve, for example.

It will further be appreciated that the material of the purge valve can be any suitable resilient material. One such material found to be particularly useful is low density polyethylene, which is utilized to form the resilient walls or bulb-like portion between the two straight lengths of tubing.

It will further be appreciated that the design of the bulb section might be changed to accommodate varying vacuum circumstances or chemical flow circumstances. For example, small convex or concave dimples or grooves might be formed in the walls of the bulb to the same effect as the tube shown in FIGS. 6 through 8. Other alterations in terms of bulb wall stiffness and projections could be utilized.

Accordingly, it will be appreciated that applicant has provided a purge valve particularly useful with select valves to purge the common passages therein of remnant or residual chemical prior to the dispensation or selection of another chemical. This is particularly useful for critical dilution ratios, for example, and where purity of the dispensed diluted mixture is important.

These and other modifications and advantages will become readily apparent to those of ordinary skill in the art without departing from the scope of this invention, and applicant intends to be bound only by the claims appended hereto.

What is claimed is:

1. Apparatus for purging common passages of a select valve and including:
   a vacuum impelled feed line connected to said valve;
   an expansible chamber operably disposed in said feed line and at least partially collapsible automatically upon application of a feed vacuum in said line while permitting material flow therethrough;
   said chamber comprising in part a portion of said feed line; and
   said chamber being expansible automatically upon termination of said feed vacuum to draw back upstream a volume of material from downstream of said chamber upon expansion of said chamber, whereby said common passages of said select valve are purged upon termination of said feed vacuum.

2. Apparatus as in claim 1 wherein the volume of material drawn back upstream is substantially equal in volume to the volume differential in said chamber between its partially collapsed and its expanded state.

3. Apparatus for drawing material back upstream from a vacuum impelled feed passage comprising:
   a vacuum impelled feed passage;
   an expansible chamber disposed in operative communication with said feed passage;
   said chamber being collapsible automatically upon application of a feed vacuum to said feed passage;
   said chamber being expansible automatically upon termination of said feed vacuum and operable to draw a volume of material disposed downstream of said chamber in an upstream direction upon expansion of said chamber.

4. Apparatus for purging a select valve of remnants of a selected material, said valve of the type having material inlet ports, and common flow passages selectively associated in operative communication with a selected inlet port and with a common outlet to a feed vacuum inducing system operable to create a vacuum in a selected inlet port and material feed line connected thereto, said apparatus comprising:
   a vacuum impelled feed line;
   an expansible chamber operably connected to said feed line;
   said chamber being at least partially collapsible automatically upon application of a feed vacuum thereto and expandable automatically upon termination of said vacuum;
   said chamber, when partially collapsed by said vacuum, defining a reduced volume and, when expanded, defining an increased volume operable to draw back toward said chamber a volume of material downstream thereof upon expansion of said chamber, whereby said common flow passages of said select valve are purged upon termination of said feed vacuum.

5. Apparatus as in claim 4 wherein said chamber is an in-line chamber defining a portion of said feed line, said chamber when partially collapsed defining material flow passages therethrough.

6. Apparatus as in claim 5 wherein said chamber has resilient walls collapsible inwardly, upon application of said vacuum, such that portions of said walls touch and form flow passages through said chamber.

7. Apparatus as in claim 5 wherein said chamber comprises an enlargement in a material feed pick up line, said enlargement having a diameter in excess of that of said pickup line.

8. Apparatus as in claim 7 further including a tube disposed in said chamber, said chamber having walls collapsible against said tube when feed vacuum is applied thereto and said tube having an internal passage therethrough for passing vacuum-impelled material therethrough when said chamber is at least partially collapsed against said tube.

9. Apparatus as in claim 8 wherein walls of said chamber expand away from said tube when said vacuum is interrupted.

10. Apparatus as in claim 5 wherein said chamber has an expanded volume and a smaller collapsed volume, the differential of which is greater than the volume of said common flow passages in said select valve.

11. Apparatus as in claim 5 wherein said feed vacuum inducing system comprises a water driven venturi and a valve for commencing and terminating flow of said water to respectively initiate and interrupt said feed vacuum.

12. Apparatus as in claim 11 wherein said chamber collapses when water drives said venturi and wherein said chamber expands, when water flow is interrupted, and draws back from said valve material remnants in common flow passages thereof.

13. Apparatus as in claim 5 wherein said chamber comprises a generally cylindrically expanded section of resilient walls in said feed line.

14. Apparatus as in claim 13 wherein the walls of said feed line resist vacuum induced collapse to a greater extent than walls of said expanded section.

15. A vacuum impelled material feed line for a valve having material passages therein, at least a portion of said feed line having resilient, partially collapsible walls collapsing automatically from a static position to a collapsed position and reducing the volume of said feed line when a feed vacuum is applied thereto while permitting material flow therethrough, and which walls, upon vacuum interruption, expand automatically to said static position from said collapsed position to increase the volume of said feed line and to draw back upstream a volume of material in said feed line downstream of said collapsible line portion upon expansion of said walls, thereby withdrawing a volume of material from material passages in said valve to purge said material passages upon termination of said feed vacuum.

16. Apparatus as in claim 15 wherein said valve is a select valve for selecting at least one of a plurality of materials for passage therethrough and wherein said material passages in said valve are common to any material flow in said valve, the volume of said common material passages being less than the volume of material drawn back upstream by said expanding feed line walls.

* * * * *